United States Patent [19]

Siegenthaler

[11] Patent Number: 5,308,432
[45] Date of Patent: May 3, 1994

[54] METHOD AND DEVICE FOR PRODUCING A TOROIDAL ROAD VEHICLE TIRE CARCASS

[75] Inventor: Karl J. Siegenthaler, Rome, Italy
[73] Assignee: Bridgestone Corporation, Tokyo, Japan
[21] Appl. No.: 991,829
[22] Filed: Dec. 16, 1992
[30] Foreign Application Priority Data
  Dec. 30, 1991 [IT]  Italy .................. TO91A001048
[51] Int. Cl.⁵ ............................................. B29D 30/34
[52] U.S. Cl. ................................ 156/117; 156/397
[58] Field of Search ............ 156/117, 123, 130, 397, 156/405.1

[56] References Cited

U.S. PATENT DOCUMENTS

| | | | |
|---|---|---|---|
| 1,328,006 | 1/1920 | McLeod | 156/117 |
| 1,374,408 | 4/1921 | Trogner | 156/117 |
| 1,420,611 | 6/1922 | Dickinson | 156/117 |
| 3,057,396 | 10/1962 | Hanson | 156/117 |
| 3,356,553 | 12/1967 | Frazier | 156/117 |
| 4,052,237 | 10/1977 | Appleby et al. | 156/117 |
| 4,277,295 | 7/1981 | Schmidt et al. | 156/117 |

FOREIGN PATENT DOCUMENTS

| | | | |
|---|---|---|---|
| 489353 | 6/1992 | European Pat. Off. | |
| 390762 | 6/1990 | Fed. Rep. of Germany | |
| 410370 | 5/1910 | France | 156/397 |

*Primary Examiner*—Geoffrey L. Knable
*Attorney, Agent, or Firm*—David A. Thomas

[57] ABSTRACT

A method and device for producing a toroidal road vehicle tire carcass having a toroidal frame rotated about its axis in relation to a winding device and defined by two coaxial annular beads and by a removable outer annular element located radially outwards of and centered axially in relation to the two beads, so as to define, with the same, two annular openings; the winding device providing for winding at least one cord about the frame along a spiral path, each turn of which comprises two portions, a first extending outside the frame, and a second extending outside the outer annular element and through both the openings.

8 Claims, 3 Drawing Sheets

1

METHOD AND DEVICE FOR PRODUCING A TOROIDAL ROAD VEHICLE TIRE CARCASS

BACKGROUND OF THE INVENTION

Technical Field

The present invention relates to a method of producing a toroidal road vehicle tire carcass. More specifically, the present invention relates to a straightforward, low-cost method of producing a toroidal radial tire carcass comprising two annular beads connected by a reticulated structure comprising a number of elongated reinforcing elements connecting and extending substantially radially in relation to the two beads.

SUMMARY OF THE INVENTION

According to the present invention, there is provided a method of producing a toroidal road vehicle tire carcass comprising two coaxial annular beads, and a number of elongated reinforcing elements located between and extending substantially radially in relation to the beads. The method is characterized by the fact that it comprises stages consisting in forming a toroidal frame supporting said carcass, the toroidal frame comprising said beads and a removable auxiliary outer annular element located radially outwards of and centered axially in relation to the two beads, so as to define, with the same, two annular openings. The toroidal frame is rotated about its axis and in relation to a device for winding at least one continuous cord. The winding device being so activated winds said cord about the toroidal frame along a spiral path comprising a number of turns, each turn defining one of said elongated reinforcing elements, and comprising two portions, a first extending outside the frame, and a second extending outside the outer annular element and through both said openings.

The present invention also relates to a device for producing a toroidal road vehicle tire carcass of the aforementioned type.

According to the present invention, there is provided a device for producing a toroidal road vehicle tire carcass comprising two coaxial annular beads, and a number of elongated reinforcing elements located between and extending substantially radially in relation to the beads. The device is characterized by the fact that it comprises a removable auxiliary annular element positioned radially outwards of and centered axially in relation to the two beads, so as to define, with the same, a toroidal frame having two annular openings; a device for winding a cord about the toroidal frame and along a given path; and a supporting and drive device for rotating the toroidal frame about its axis and in relation to said winding device, so that said path is a spiral path comprising a number of turns, each defining one said elongated reinforcing element, and comprising two portions, a first extending outside the frame, and a second extending outside the outer annular element and through both said openings.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 3:
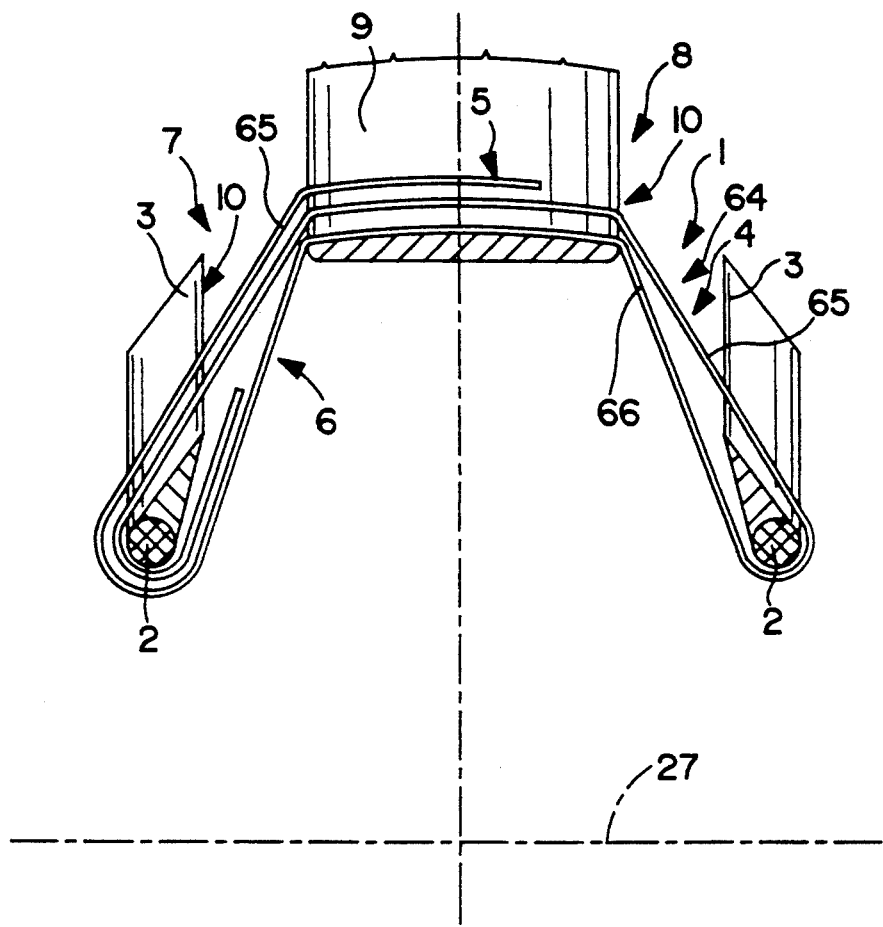
FIG. 3 shows a schematic cross section of the tire carcass being formed on the FIGS. 1 and 2 device.

Number 1 in FIG. 3 indicates a toroidal carcass for a road vehicle tire. Carcass 1 comprises two annular beads 2 with respective fillers 3; and a toroidal reticulated structure 4 connecting beads 2 and defined by at least one continuous cord 5 wound spirally about beads 2 in laterally-contacting turns 6. Each turn 6 defines an elongated reinforcing element connecting and extending substantially radially in relation to beads 2.

According to a variation not shown, a number of cords 5 are used for defining a multi-start spiral reticulated structure 4, or for covering respective successive portions of carcass 1.

Carcass as described above is formed on a supporting frame 7 comprising an inner portion defined by beads 2; and a removable auxiliary outer portion 8 defined by a ring 9 consisting (not shown) of a number of releasably-connected curved segments. Ring 9 is located radially outwards of and centered axially in relation to beads 2, so as to define, with the same, two annular openings 10.

Figure 1:
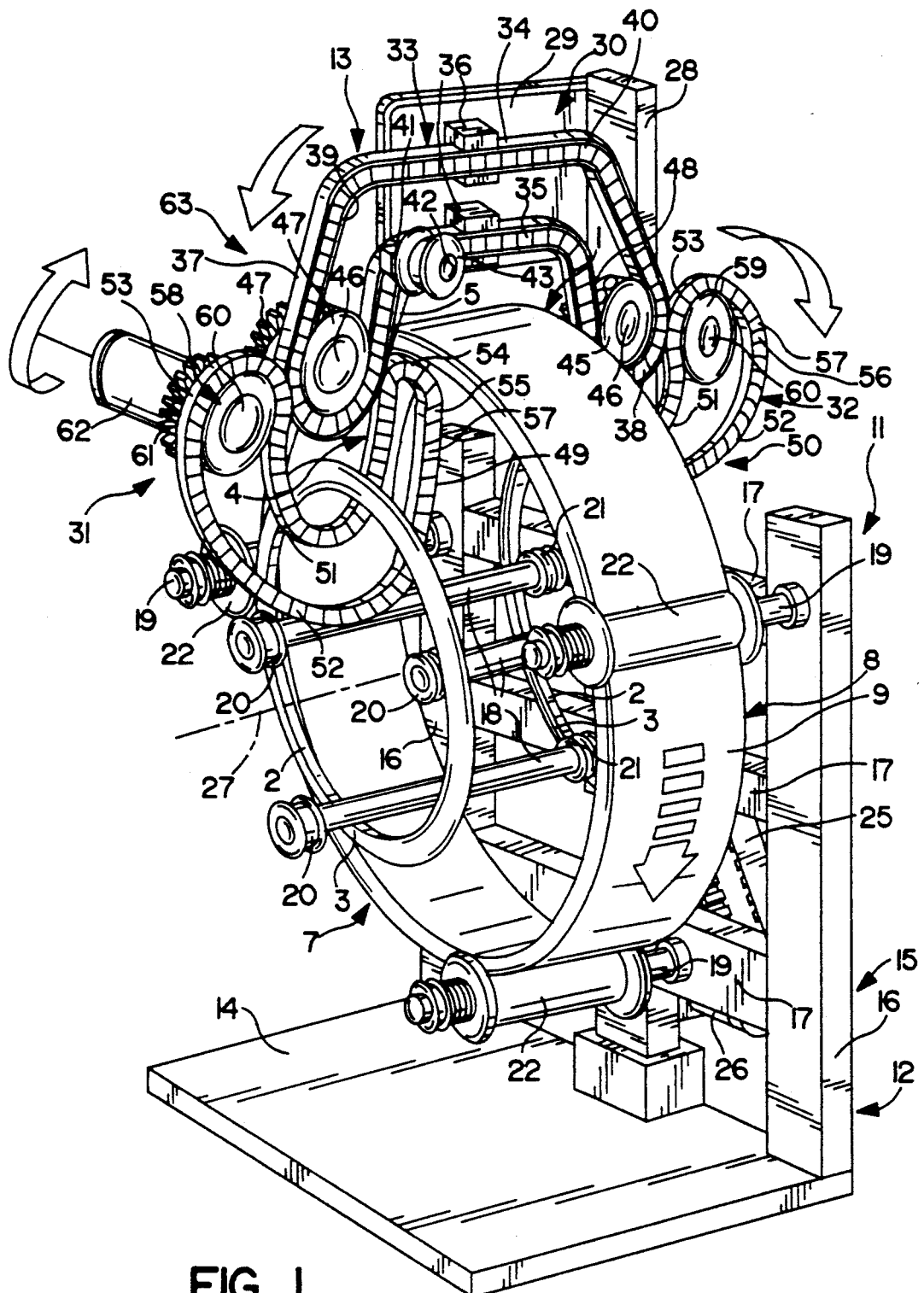
FIG. 1 shows a schematic view in perspective of a preferred embodiment of the device according to the present invention.

As shown in FIG. 1, ring 9 forms part of a device 11 for forming carcass 1, and comprises a unit 12 for supporting and driving frame 7, and a device 13 for winding cord 5 spirally about frame 7.

Unit 12 comprises a base 14 from which extends upwards a reticulated frame 15, defined by two uprights 16 connected by a number of cross members 17. Frame 15 is fitted in a rotary manner with three first horizontal shafts 18 parallel to one another, and arranged about a first cylindrical surface. Three second shafts 19 are parallel to one another and to shafts 18, and are arranged about a second cylindrical surface coaxial with and outwards of said first cylindrical surface.

Each shaft 18 is fitted with two rollers 20 and 21 spaced a given distance apart. In particular, rollers 20 present respective intermediate coplanar grooves for receiving respective inner peripheral portions of one of the beads 2. Rollers 21 present respective intermediate coplanar grooves for receiving respective inner peripheral portions of one of the other beads 2. Shafts 19 are fitted with respective rollers 22 having respective intermediate coplanar grooves for receiving respective outer peripheral portions of ring 9.

Figure 2:
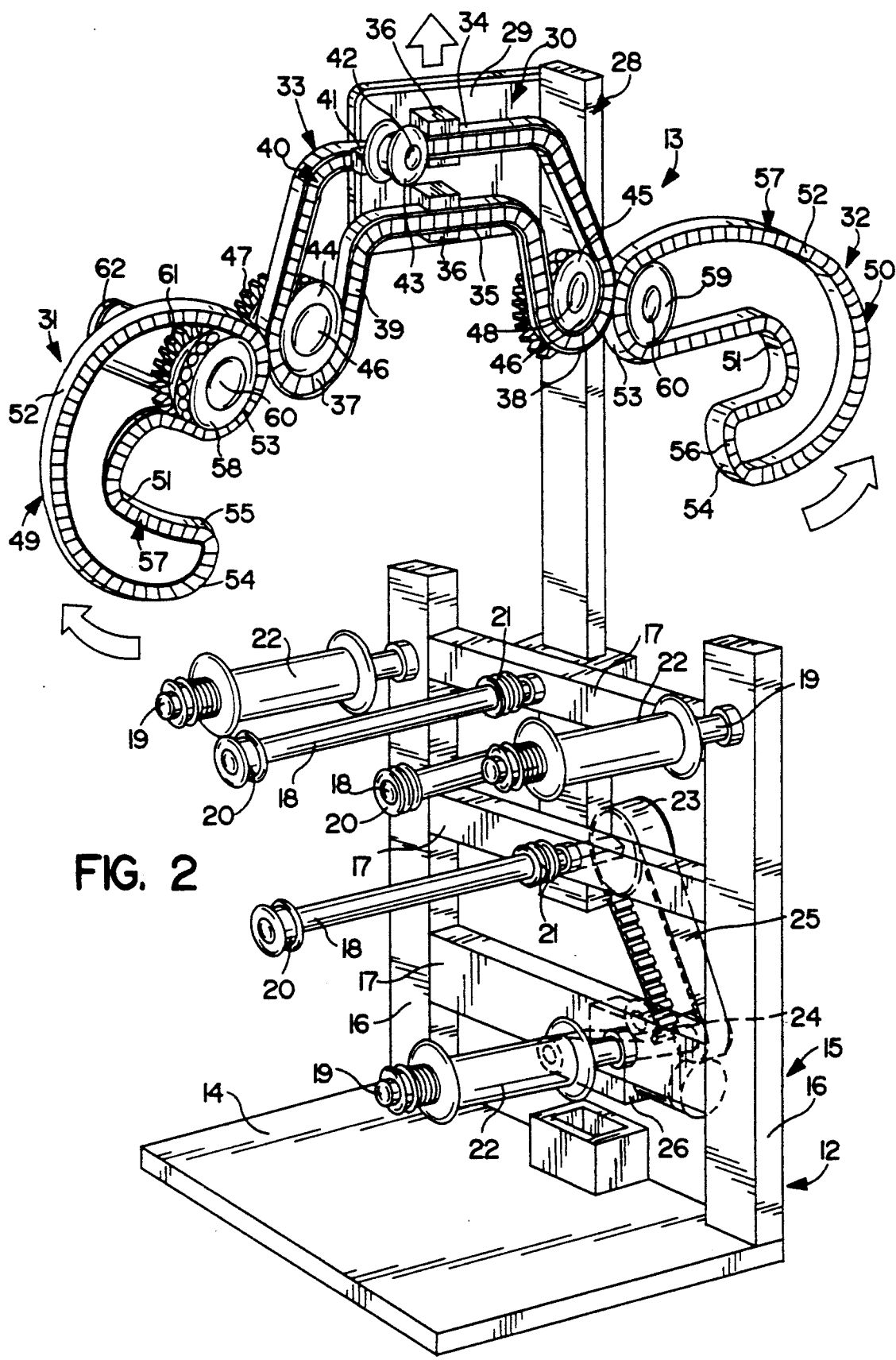
FIG. 2 shows a schematic view in perspective of the FIG. 1 device in a different operating position.

As shown in FIG. 2, one of the shafts 18 and one of the shafts 19 extend through frame 15, and are fitted with respective toothed pulleys 23 and 24 connected by a drive belt 25. Pulley 24 is also connected in a known manner (not shown) to the output of a geared motor 26 supported on frame 15 which rotates frame 7 clockwise (FIG. 1) and at a given substantially constant angular speed about its axis 27.

Frame 15 supports a central upright 28 connected to frame 15 so as to move, by virtue of a known actuator (not shown), between a raised idle position (FIG. 2) and a lowered operating position (FIG. 1). The top end of upright 28 is fitted with a plate 29 supporting winding device 13, and is located over shafts 18 and 19 and substantially radially in relation to frame 15.

As shown in FIGS. 1 and 2, winding device 13 comprises a central guide element 30; and two lateral guide elements 31 and 32 on either side of central element 30.

Central element 30 is located outwards of frame 7 and parallel to plate 29. Element 30 consists of a loop-shaped tube 33 comprising two straight horizontal portions 34 and 35 parallel to shafts 18 and 19, and are connected to plate 29 by respective brackets 36. Two substantially U-shaped end portions 37 and 38, each facing a respective opening 10, connects the respective ends of portions 34 and 35. Tube 33 is fitted inside in sliding manner with a known ball chain 39 looped along tube 33 and engaged, through an axial front opening 40 extending along the whole of tube 33, by a carriage 41 connected releasably, e.g. magnetically, to chain 39. Carriage 41 presents a pin 42 perpendicular to plate 29 and supporting for rotation, preferably against the action of a spiral spring (not shown), a spool 43 wound with cord 5.

Along each end portion 37 and 38, tube 33 is open internally for enabling chain 39 to mesh with toothed pulleys 44 and 45, about which portions 37 and 38 are looped respectively. Pulleys 44 and 45 are mounted for rotation on respective shafts 46, parallel to pin 42 and supported on plate 29, by respective brackets (not shown), and are integral with respective gears 47 and 48.

Each lateral guide element 31 and 32 is defined by an annular, substantially banana-shaped tube 49 and 50, coplanar with central element 30. More specifically, each tube 49 and 50 comprises a curved inner portion 51; a curved outer portion 52 substantially parallel to portion 51; and two semicircular portions 53 and 54 connecting the respective ends of portions 51 and 52.

Tubes 49 and 50 are fitted inside in a sliding manner with a ball chain 55 and 56, similar to chain 39, and are accessible from the outside through an axial front opening 57 extending along the whole of tubes 49 and 50.

Portions 53 of elements 31 and 32 are open internally and are looped about respective toothed pulleys 58 and 59 meshing with chains 55 and 56, and are mounted for rotation on respective shafts 60 parallel to pin 42, and are supported on plate 29 by respective brackets (not shown). Pulleys 58 and 59 are integral with respective gears 61 (only one of which is shown) meshing respectively with gears 47 and 48.

Pulley 58 and a respective gear 61 are connected angularly to the output of a motor 62 for driving chains 39, 55 and 56. Each lateral element 31 and 32 is rotatable about the axis of a respective shaft 60, between an open idle position (FIG. 2) wherein elements 31 and 32 are located laterally outwards of frame 15, thus enabling upright 28 to move up and down between said idle and operating positions; and a closed operating position. In the closed operating position, with upright 28 in the lowered operating position, respective tubes 49 and 50 extend through respective beads 2 and openings 10, and the opposite ends of respective curved inner portion 51 are substantially tangent to respective end portions 37 and 38, and substantially aligned with the opposite straight portions of respective portions 37 and 38.

In actual use, prior to commencing formation of carcass 1, upright 28 is raised and lateral guide elements 31 and 32 are opened, so as to fit beads 2 coaxially with axis 27 and onto respective rollers 20 and 21, and assemble ring 9, which is also coaxially with axis 27, whereby its outer surface contacts rollers 22.

Upright 28 is then lowered, and lateral guide elements 31 and 32 are closed into the operating position through respective beads 2 and surrounding respective end portions 37 and 38 of central guide element 30 as described above.

At this point, one end of cord 5 on spool 43 is knotted by hand to one of the beads 2. Motor 62 is activated (FIG. 1) for driving chain 55 clockwise along tube 49 of lateral element 31, and anticlockwise through and about a respective bead 2 along inner portion 51 of lateral element 31; for driving chain 39 anticlockwise along tube 33 of central element 30; and for driving chain 56 clockwise along tube 50 of lateral element 32, and anticlockwise through and about respective bead 2 along inner portion 51 of lateral element 32.

As described later on, the above operation of chains 55, 39 and 56 causes spool 43 to travel (anticlockwise in FIG. 1) along an annular path 63 defined by portion 34: a first straight portion of portion 37: portion 51 of lateral element 31; a second straight portion of portion 37; portion 35; a first straight portion of portion 38; portion 51 of lateral element 32; and a second straight portion of portion 38.

The above displacement of spool 43, combined with rotation of frame 7 about axis 27 by geared motor 26, winds cord 5 (FIG. 3) about frame 7 along a spiral path 64 consisting of a number of laterally-contacting turns 6, each comprising two portions 65 and 66; portion 65 extending outside frame 7; and portion 66 extending outside ring 9, but through both openings 10, and being connected to two adjacent portions 65 through beads 2.

This is made possible by each of the points of tangency between portions 51 of elements 31 and 32 and end portions 37 and 38 of central element 30, acting as a switch point for carriage 41. Carriage 41, possibly with the aid of fixed switch elements (not shown) welded to tube 33, is driven by chain 39 to a first switch point on to chain 55; by chain 55 to a second switch point back on to chain 39; by chain 39 to a third switch point on to chain 56; and by chain 56 to a fourth switch point back on to chain 39.

Continuing as described above, substantially the whole of frame 7 is eventually wound with cord 5, with the exception, obviously being a final portion of frame 7, substantially as long as the thickness of winding device 13, which is completed differently, e.g. by manually winding cord 5 over the respective portion of path 64.

An important point to note about carcass 1 is that the above method enables the use, with obvious advantages in terms of uniformity, of a single cord 5, i.e. of constant chemical-physical characteristics over the entire carcass, as opposed to the countless number of cords currently employed on known carcasses and normally differing chemically and physically.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A method of producing a toroidal road vehicle tire carcass comprising two coaxial annular beads, and a number of elongated reinforcing elements located between and extending substantially radially in relation to the beads; said method comprising the steps of forming a toroidal frame for supporting said carcass, the toroidal frame comprising said beads and a removable auxiliary outer annular element located radially outwards of and centered axially in relation to the two beads, so as to define, with the same, two annular openings; providing a device for winding at least one continuous cord which includes a central guide element and a first and second lateral guide element and a carriage; moving the lateral guide elements from a first open idle position to a second closed operating position such that when in the closed operating position, each lateral guide element extends through a corresponding bead; moving said carriage along said guide elements with switching of said moving carriage selectively between the central guide element and the first and second lateral guide elements while simultaneously rotating the toroidal frame about its axis and in relation to the device for winding at least one continuous cord; winding said cord, via the movement of said carriage and simultaneous rotation of said toroidal frame, about the toroidal frame along a spiral path comprising a number of turns, each turn defining one of said elongated reinforcing elements, and comprising first and second portions, the first portion extending outside the frame, and the second portion extending outside the outer annular element and through both of said openings.

2. A method as claimed in claim 1, in which the second portion of each of said turns is connected to two first portions of two adjacent turns through the two beads.

3. A method as claimed in claim 1, in which the cord is wound off a respective spool on said winding device; said spool traveling on the winding device along an annular path as said frame is rotated about its axis.

4. A device for producing a toroidal road vehicle tire carcass comprising two coaxial annular beads, and a number of elongated reinforcing elements located between and extending substantially radially in relation to the beads; said device comprising a removable auxiliary annular element adapted to be positioned radially outwards of and centered axially in relation to the two beads, so as to define, with the same, a toroidal frame having two annular openings; a winding device for winding a cord about the toroidal frame and along a given path including a carriage and guide means having a central guide element and a pair of lateral guide elements which are movable between an open idle position and a closed operating position such that when in the closed operating position, each lateral guide element extends through a corresponding bead; switch means for selectively switching the carriage between the central guide element and the lateral guide elements as the carriage moves along an annular path defined by said guide means; and a supporting and drive device for rotating the toroidal frame about its axis and in relation to said winding device, so that said path is a spiral path comprising a number of turns, each defining one of said elongated reinforcing elements, and comprising first and second portions, the first portion extending outside the frame, and the second portion extending outside the outer annular element and through both of said openings.

5. A device as claimed in claim 4, in which the second portion of each of said turns is connected to two first portions of two adjacent turns through the two beads.

6. A device as claimed in claim 4, in which the winding device further comprises drive means engaged by said carriage and traveling along said guide means, for moving said carriage along said path; and a spool wound with said cord and mounted for rotation on said carriage.

7. A device as claimed in claim 6, in which said path extends through both of said beads and both of said openings.

8. A device as claimed in claim 6, in which said lateral guide elements are designed to move between a closed operating position, wherein they cooperate with said frame and wherein said path is a closed annular path extending through both of said beads and both of said openings, and an open idle position, wherein said lateral guide elements are positioned laterally outwards from said frame.

* * * * *